United States Patent
Topps

(10) Patent No.: US 12,418,406 B2
(45) Date of Patent: Sep. 16, 2025

(54) AUTHENTICATION USING A DECENTRALIZED AND/OR HYBRID DECENTRALIZED SECURE CRYPTOGRAPHIC KEY STORAGE METHOD

(71) Applicant: Barbara Jean Wilk, Nesconset, NY (US)

(72) Inventor: Ryan Joseph Topps, Nesconset, NY (US)

(73) Assignee: Barbara Jean Wilk, Nesconset, NY (US)

(*) Notice: Subject to any disclaimer, the term of this patent is extended or adjusted under 35 U.S.C. 154(b) by 185 days.

(21) Appl. No.: 17/942,475

(22) Filed: Sep. 12, 2022

(65) Prior Publication Data

US 2023/0077053 A1    Mar. 9, 2023

Related U.S. Application Data

(63) Continuation-in-part of application No. 16/396,367, filed on Apr. 26, 2019, now Pat. No. 11,917,061.

(60) Provisional application No. 63/369,587, filed on Jul. 27, 2022, provisional application No. 63/220,556, filed on Jul. 11, 2021.

(51) Int. Cl.
    *H04L 9/08*    (2006.01)

(52) U.S. Cl.
    CPC .......... *H04L 9/0825* (2013.01); *H04L 9/0861* (2013.01); *H04L 9/0894* (2013.01)

(58) Field of Classification Search
    USPC ........................................ 713/171
    See application file for complete search history.

(56) References Cited

U.S. PATENT DOCUMENTS

| | | | | |
|---|---|---|---|---|
| 10,504,109 | B2* | 12/2019 | Feraud | H04L 9/3215 |
| 2011/0305342 | A1* | 12/2011 | Manaka | G06F 21/10 |
| | | | | 380/286 |
| 2017/0012951 | A1* | 1/2017 | Mennes | H04L 63/10 |
| 2018/0293407 | A1* | 10/2018 | Wu | G06F 21/80 |
| 2020/0082088 | A1* | 3/2020 | Muthukumaran | G06F 21/64 |

* cited by examiner

*Primary Examiner* — Sanchit K Sarker

(57) ABSTRACT

Mutual dependency between two devices is established by creating mutual dependency tokens containing stateful information to be stored on the issuing device and the client device. The tokens can be used for both web/application-level authentication and network-level authentication. Tokens for IP or MAC addresses can be created and stored in a modified route table, allowing for the creation of private virtual subnets.

5 Claims, 18 Drawing Sheets

AUTHENTICATION USING A DECENTRALIZED AND/OR HYBRID DECENTRALIZED SECURE CRYPTOGRAPHIC KEY STORAGE METHOD

CROSS-REFERENCE TO RELATED APPLICATIONS

This application claims priority from U.S. provisional patent application No. 63/220,556, filed Jul. 11, 2021, and from U.S. provisional patent application No. 63/369,587, filed Jul. 27, 2022.

In addition, this application is a continuation-in-part of U.S. patent application Ser. No. 16/396,367, filed Apr. 26, 2019, entitled "DECENTRALIZED AND/OR HYBRID DENCENTRALIZED SECURE CRYPOGRAPHIC KEY STORAGE METHOD."

The entire contents of each of the above provisional and nonprovisional applications are incorporated herein by reference.

TECHNICAL FIELD

The present disclosure relates in general to cyber security and more particularly to creating and authenticating tokens using a decentralized and/or hybrid decentralized secure cryptographic key storage method.

BACKGROUND

Computer networking was created to allow for free open communications between devices. Security was never thought considered a concern in the early days of networking. This lack of foresight has resulted in a security nightmare. Many authentication schemes have been created, but the vast majority exists at the application level, not the network level. Furthermore, none of the current internet security methods are capable of removing a third party without creating a single point of failure.

U.S. patent application Ser. No. 16/396,367, the contents of which are incorporated herein by reference, discloses a decentralized and/or hybrid decentralized method of storing cryptographic keys which removes the single point of failure. In its most basic form, this method, which referred to herein as "mutual dependency architecture" comprises encrypting an initial cryptographic key for a device by another cryptographic key known as the "unlock" key. The unlock key is encrypted by still another key, referred to as the "store key," creating an encrypted seed. The encrypted seed, which is never stored on the device, is transmitted to a central authority which requires some form of authentication. The store key is then stored in unencrypted form with the encrypted stored keys. This creates a hybrid-decentralized model without a central point of failure. If the central authority is breached, the data in the central device is rendered useless without the data stored on the devices.

SUMMARY

The present disclosure relates to various authentication schemes utilizing mutual dependency architecture.

In a first authentication scheme, mutual dependency between two devices is established by creating mutual dependency tokens containing stateful information to be stored on the issuing device and the client device. An unencrypted or "naked" key and an encrypted store key are kept by the issuer token, and an encrypted unlock key is kept by the client token. Other data such as encrypted secret data and the store key hash can be kept by either the issuer token, the client token, or both. When a client provides its token to an issuer for authentication, the issuer uses the naked key in its token to decrypt the encrypted unlock key of the client token. The decrypted client token unlocks key decrypts the issuer token encrypted store key. The plain text of the store key is then hashed by the same algorithm that produced the store key hash. If the hashes match, the client provided a valid unlock key and is authenticated.

In a second authentication scheme, tokens created using the first scheme are used for web/application-level authentication. The issuer will have to store the tokens in a database with an identifier. The database does not have to be secure due the nature of the token generation rendering issuer tokens useless with out their corresponding client token. Client tokens can be stored in a client application or web browser. The client will submit its client token to the web server application who has issued the tokens to be verified in the process described int the first scheme.

In a s third scheme, tokens created using the first scheme are used for network-level authentication. First, two devices that wish to establish a connection must create client and issuer tokens and exchange the tokens as described above. Both devices will create issuer tokens on themselves and store the corresponding client token on the other. A public key pair is generated by the issuer and stored within the issuer and client tokens. The public keys are stored in both the issuer and client metadata and the private keys within the issuer secret. To access these keypairs, device 1 will submit its client token to device 2, and device 2 decrypts its private key. Device 2 submits its client token to device 1 and device 1 decrypt sits private key. Once both keypairs are unlocked, any encryption, key exchange, and signature operations requiring two key pairs can be done.

Once the mutual dependency tokens are created, each device has a public/private key pair that is sealed using the mutual dependency. Connection authentication can now occur. An incoming TCP or UDP connection will be read by the tun/tap interface. Rather than the packets being forward to listening applications, the interface handles the connection request. The interface responds respond with a challenge request, which requests the client token. If the connecting device successfully delivers the client token and passes authentication, the connection is considered authenticated, and the connection's packets are be forwarded to listening application(s) or routed as requested.

In a fourth authentication scheme, tokens for IP or MAC addresses are created using the first scheme and third scheme and are stored in a modified route table, allowing for the creation of private virtual "subnets". Subnet is used in place of virtual private networks, subnets, and clouds. To create more than one subnet, each token must store a unique identifier, known as the subnet id, in its secret or metadata that is consistent across all device tokens in the subnet. These subnet ids allow for more than one token to present per IP address or MAC address and allow for these addresses to have overlapping subnets. The route table can be expanded to store the subnet id for performance benefits.

DETAILED DESCRIPTION

Glossary of Terms

Device—any unit of electronic equipment or hardware equipment having computing ability.

Central authority—a computing device that can be configured as a server and is capable of authentication and storage.

Cryptographic key—a string of data that is used to lock or unlock cryptographic functions, including authentication, authorization and encryption.

Encrypted stored key—a cryptographic key that has been encrypted and stored on a device.

Unlock key—a cryptographic key used to encrypt an encrypted stored key.

Encrypted seed—an encrypted unlock key.

Store key—a cryptographic key used to encrypt an encrypted seed.

Network—a group of two or more intelligent devices connected by physical or wireless connections and able to communicate with one another; the term refers to internets of things or devices, as well as to conventional computer networks.

Mutual dependency architecture—a scheme allowing for two devices to create a mutual trust using cryptographic key storage, as described in U.S. patent application Ser. No. 16/396,367.

TUN/TAP interface—a programmatic interface that allows for a program to route all device traffic through a virtual network interface and read and write packets to the interface.

Token relation—Two devices will create issuer tokens on themselves and store the corresponding client token on the other.

Subnet—a virtual private network, subnet or cloud.

As required, detailed embodiments of the present invention are disclosed herein; however, it is to be understood that the disclosed embodiments are merely exemplary of the invention that may be embodied in various and alternative forms. The figures depicting schemes are just a few of all the possible implementations. Therefore, specific structural and functional details disclosed herein are not to be interpreted as limiting, but merely as a representative basis for teaching one skilled in the art to variously employ the present invention.

Figure 1:
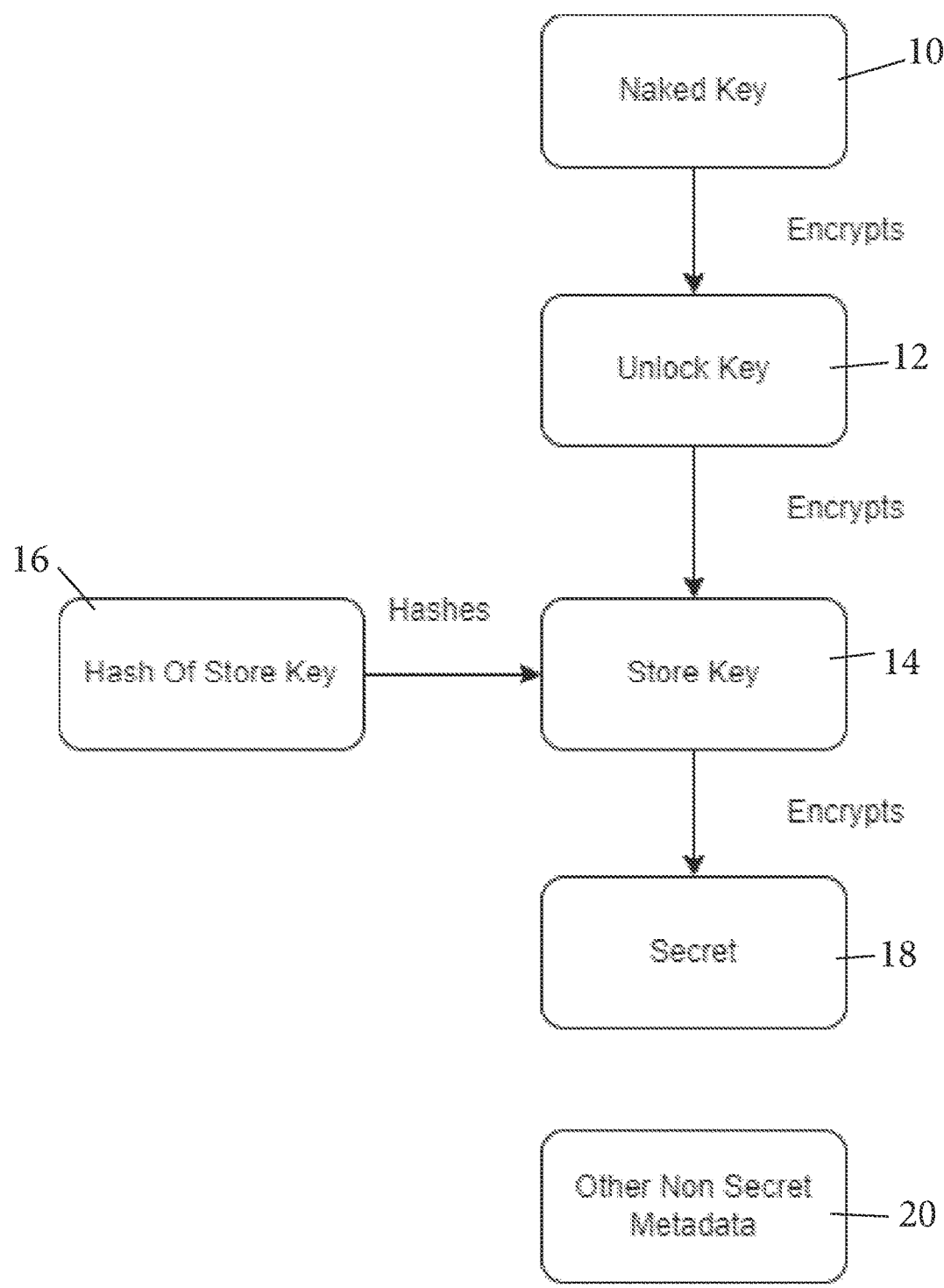
FIG. 1 is a visual representation of a method of token creation.

All schemes are dependent on creating mutual dependency tokens. These tokens require stateful information to be stored on the issuer and client. FIG. 1 shows a method of creating mutual dependency token data creation using a slightly modified version of the mutual dependency architecture disclosed in U.S. patent Ser. No. 16/396,367. The naked, unlock, and store keys 10, 12, 14 are all cryptographic keys of any type that provide the ability to encrypted/decrypt plain and cipher text through an algorithm. The store key hash is the output of a cryptographic hash algorithm of the unencrypted store key. The secret is optional, depending on scheme, and can be anything that the issuer would like to store encrypted i.e., a private key of a public key pair that is unique to the client/issuer and/or sensitive information about the client. The other metadata is data that is non secret and can contain anything the issuer/client would like for their application i.e., an identifier for the tokens.

Figure 2:
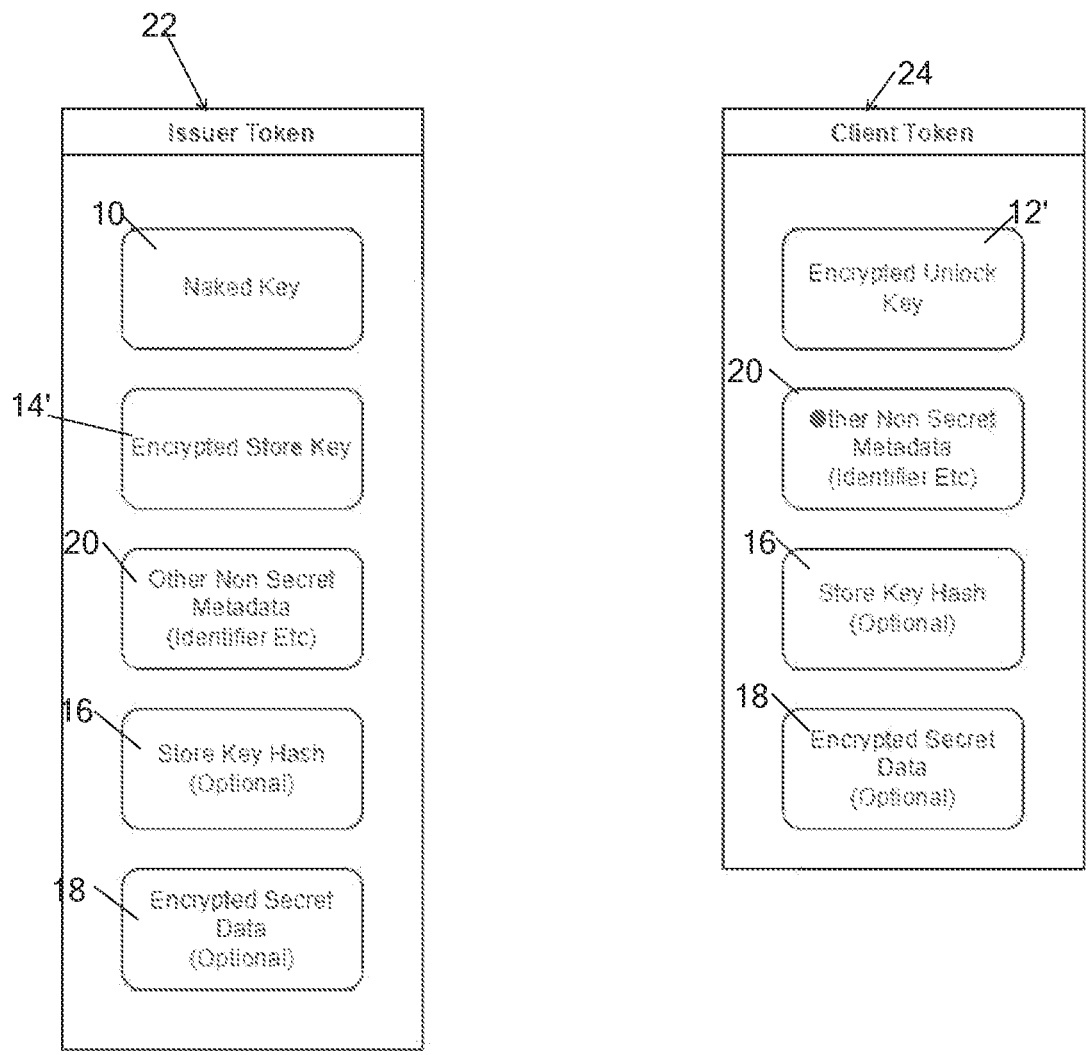
FIG. 2 is a visual representation of token architecture.

Once the Token data is created it is stored in two parts, as shown in FIG. 2. Two tokens are created, the issuer token which is stored by the issuer and the client token which is stored by the client. The mandatory data kept by the issuer token are the naked key, encrypted store key. The mandatory data kept by the client token is the encrypted unlock key. The encrypted secret data and the store key hash can either be kept by the issuer token, the client token, both, or a permutation of the previous options i.e., the client token keeps the encrypted secret, and the issuer token keeps the store key hash. The security of these components is not compromised by any configuration of store key hash and encrypted secret data, as it cannot be used unless the naked key, encrypted unlock key, and the encrypted store key are present to be able to decrypt the store key to produce the hash for verification and to decrypt the encrypted secret data. This means even if the issuer leaks all data to a malicious actor, it is useless without the corresponding client token. To acquire that data, a malicious entity will require both tokens. This concept makes these tokens are impossible to forge with only a single token.

Figure 3:
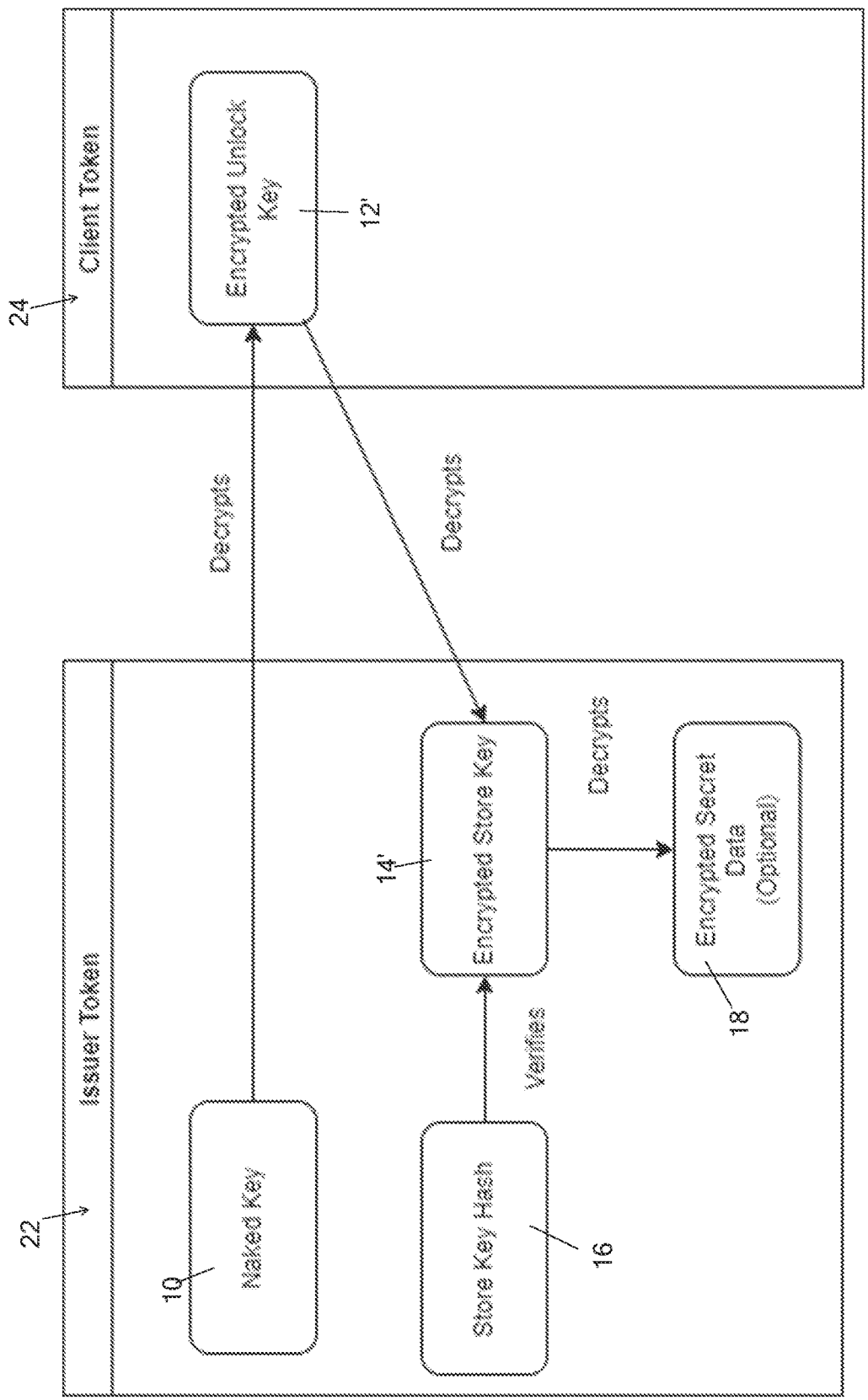
FIG. 3 is a visual representation of a method of token verification.

Token authentication is described in FIG. 3. For simplicity only the core components of each token are shown, and the issuer has kept the secret data and store key hash in its token. The client will provide its token to the issuer for authentication. The issuer will use the naked key in its' token to decrypt the encrypted unlock key of the client token. The decrypted client token unlock key will decrypt the issuer token encrypted store key. The plain text of the store key will be hashed by the same algorithm that produced the store key hash. If the hashes match the client provided a valid unlock key and is authenticated. From there the issuer can decrypt any of the secret data if there is any. These tokens can have expirations applied if desired and the date can be either stored on the issuer token's metadata or in the secret data.

Figure 4:
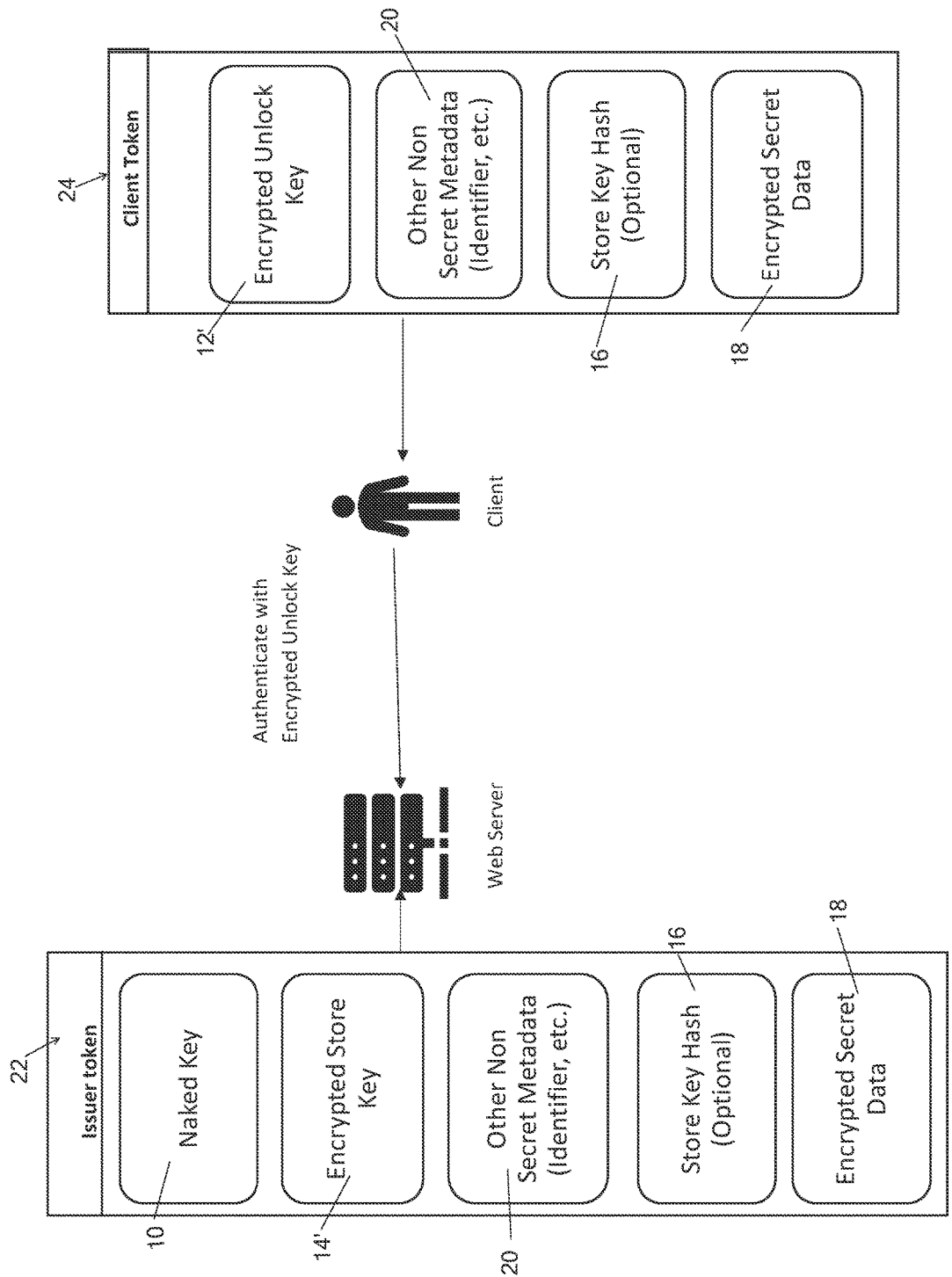
FIG. 4 is a visual representation of web authentication.

These tokens can be used for web server/application authentication. All that is required is for the application or server to store their issuer tokens in some type of data store. Client tokens can be stored on a web browser like all other web tokens. These tokens can be easily invalidated by storing a fail in the metadata of the issuer tokens on the server or by simply deleting them. This configuration is shown in FIG. 4.

Figure 5:
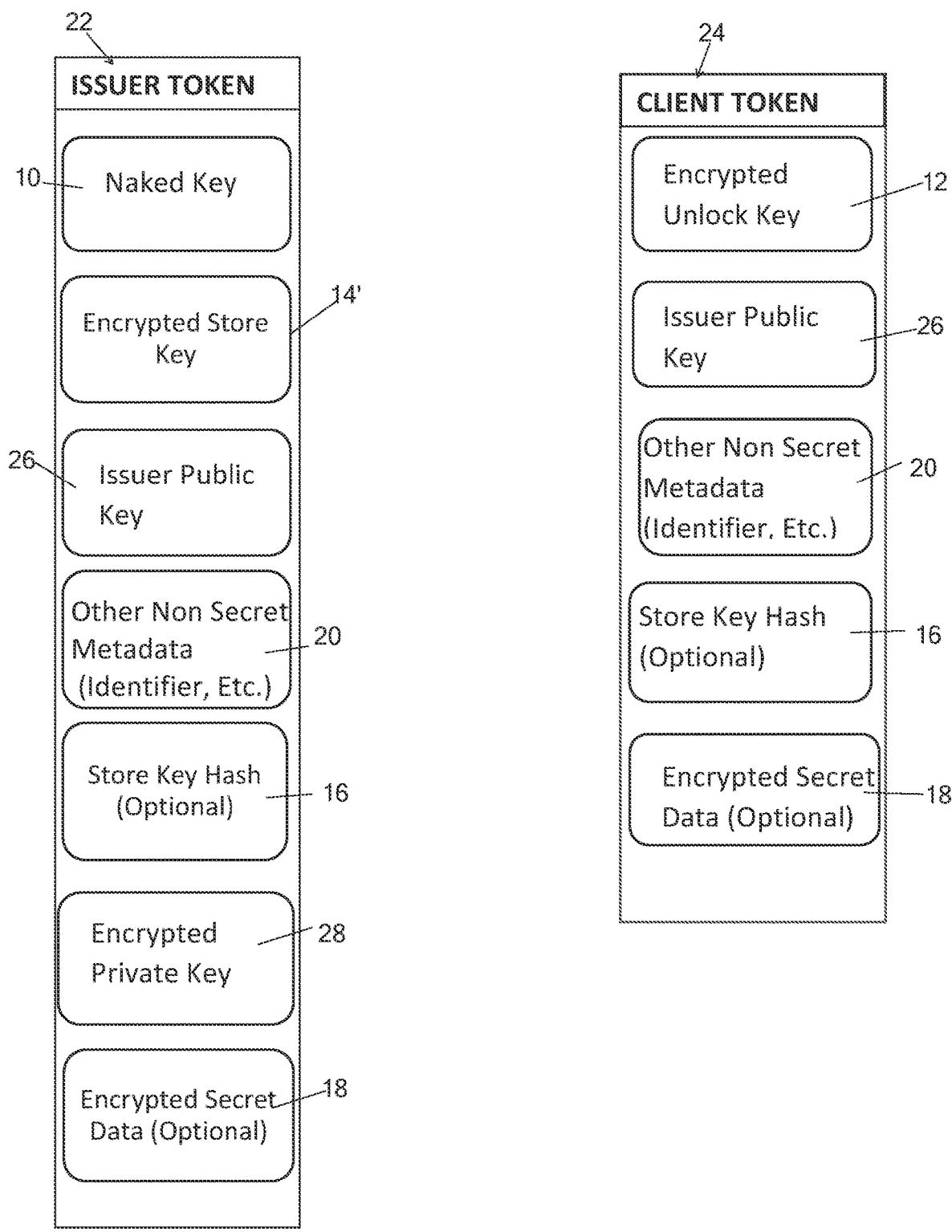
FIG. 5 is a visual representation of connection authentication token architecture.

The establishment of the mutual dependency tokens between two devices must occur before the connection authentication scheme can begin. Tokens are created and exchanged using the processes show in FIGS. 1-4 and described above. Two devices that wish to establish a connection will both create token pairs and issue client tokens to each other. A Public key pair 26, 28 is generated by the issuer and stored within the issuer and client tokens. The public key 26 would be stored in both the issuer and client metadata and encrypted private keys 28 within the issuer secret. The final storage configuration is shown in FIG. 5. To access these keypairs, device 1 will submit its client token to device 2. Device 2 will decrypt its private key. Device 2 will submit its client token to device 1 and device 1 will decrypt its private key using the decryption method shown in FIG. 3. Now that both keypairs are unlocked, any encryption, key exchange, and signature operations requiring two key pairs can be done.

Figure 6:
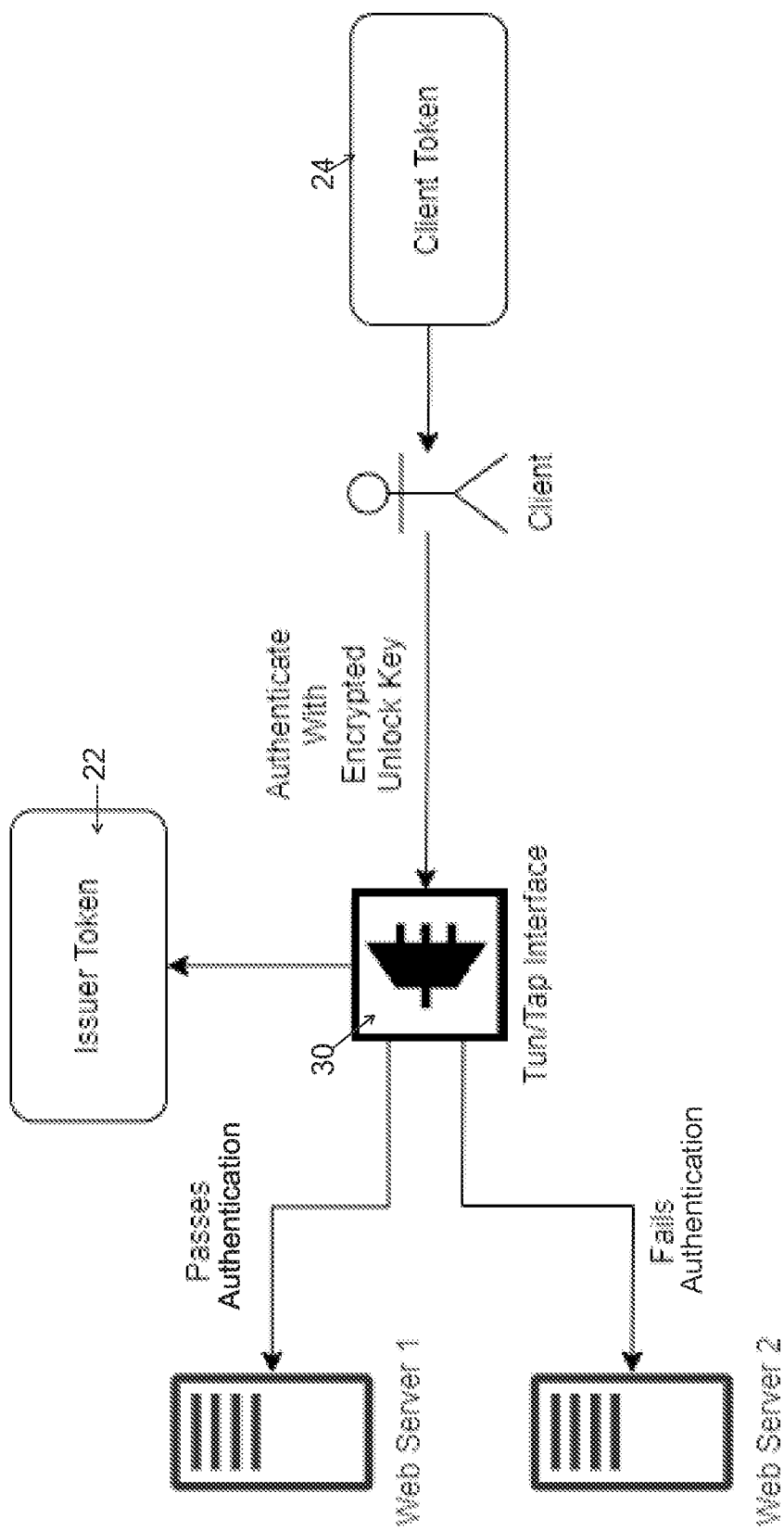
FIG. 6 is a visual representation of a method of web server forwarding.

Once the mutual dependency tokens are created, the devices will have each have a public/private key pair that is sealed using the mutual dependency. Connection authentication can now occur. An incoming TCP or UDP connection will be read by a tun/tap interface 30. Rather than the packets being forward to listening applications, the interface will handle the connection request. The interface will respond with a challenge request, which is requesting the client token 24. If the connecting device can successfully deliver the client token 24 and pass authentication, the connection is considered authenticated, and the connection's packets will be forwarded to listening application(s) or routed as requested. Non-authenticated connections can simply be dropped and ignored entirely or rerouted to an entirely separate application. In one example, as shown in FIG. 6, if the connecting device passes, the connection's packets are routed to webserver application 1, and if the connecting device fails, the connection's packets are routed to webserver application 2.

Optionally, an interface may implement TLS or SSL with the stored public key pairs. In this scenario, both devices create and exchange keys using the processes shown in FIGS. 1-4. A public key pair is be generated by the issuer and stored within the issuer and client tokens. The public keys are be stored in both the issuer and client metadata, and the private keys are stored within the issuer secret, in the configuration shown in FIG. 5. To access these keypairs, device 1 submits its client token to device 2. Device 2 decrypts its private key. Device 2 submits its client token to device 1 and device 1 decrypts its private key using the method shown in FIG. 3. Once both have access to their key pairs, a Diffie-Hellman exchange can occur to create a session key between two devices. This approach has benefits as the key pairs are the same and secured and can be used to easily track communications between two devices over remote connections as the same public keys will be used to initiate connections.

This connection authentication scheme can allow for even the simplest most unsecure applications to have strong network security as the devices implementing such method can allow connections only from valid devices. For example, a basic FTP server can be wide open to internet with no firewall. This interface can drop any non-authenticated connection request and only allow authenticated devices to form a secure tunnel to access the files on the server. These devices can be anywhere in the world and do not need to be on secure physical network, thus removing the need for application-level security entirely for this use case.

Figure 7:
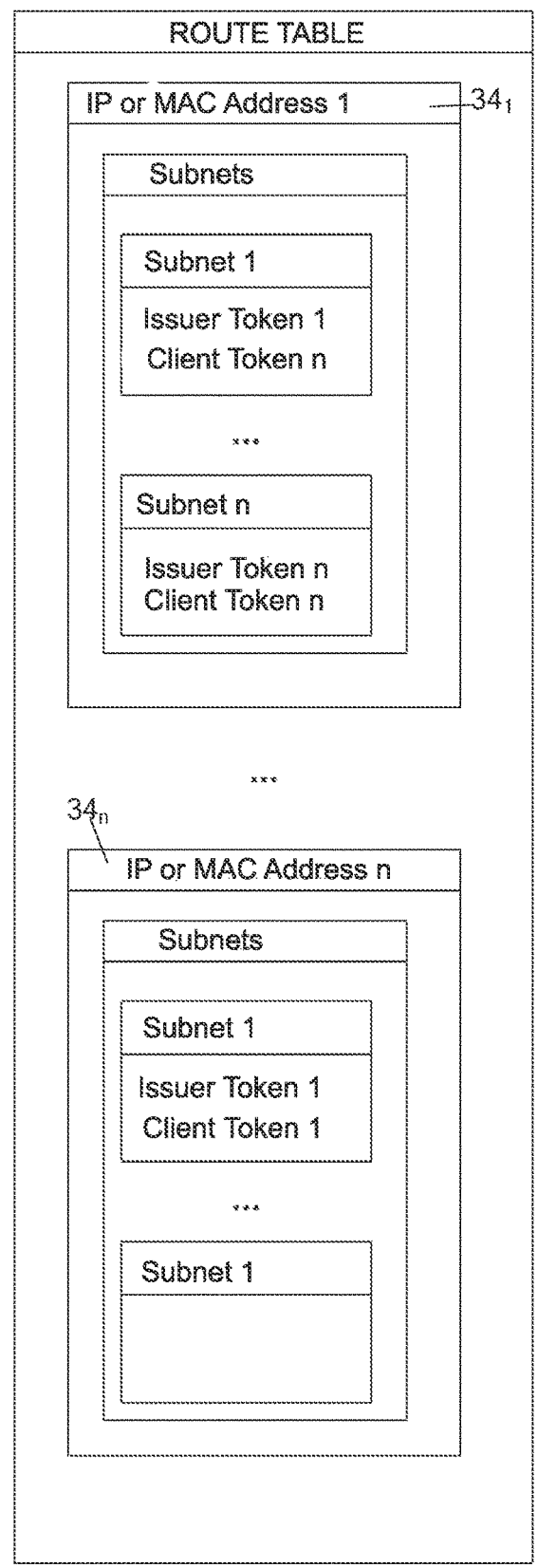
FIG. 7 is a visual representation of a route table.

Such a scheme can allow for the creation of infinite private subnets on top of the wider physical and digital internet regardless of whether the devices are located on a local area network or remotely. This can be achieved by having a modified route table 32 that stores the corresponding tokens for IP or MAC addresses $341_{1-n}$. To create more than one subnet the tokens will need to store a unique identifier, known as the subnet id, in its secret or metadata that is consistent across all device tokens in the subnet. These subnet ids will allow for more than one token to present per IP address or MAC address and allow for these addresses to have overlapping subnets. The route table can be expanded to store the subnet id for performance benefits. This configuration is shown in FIG. 7.

Figure 8:
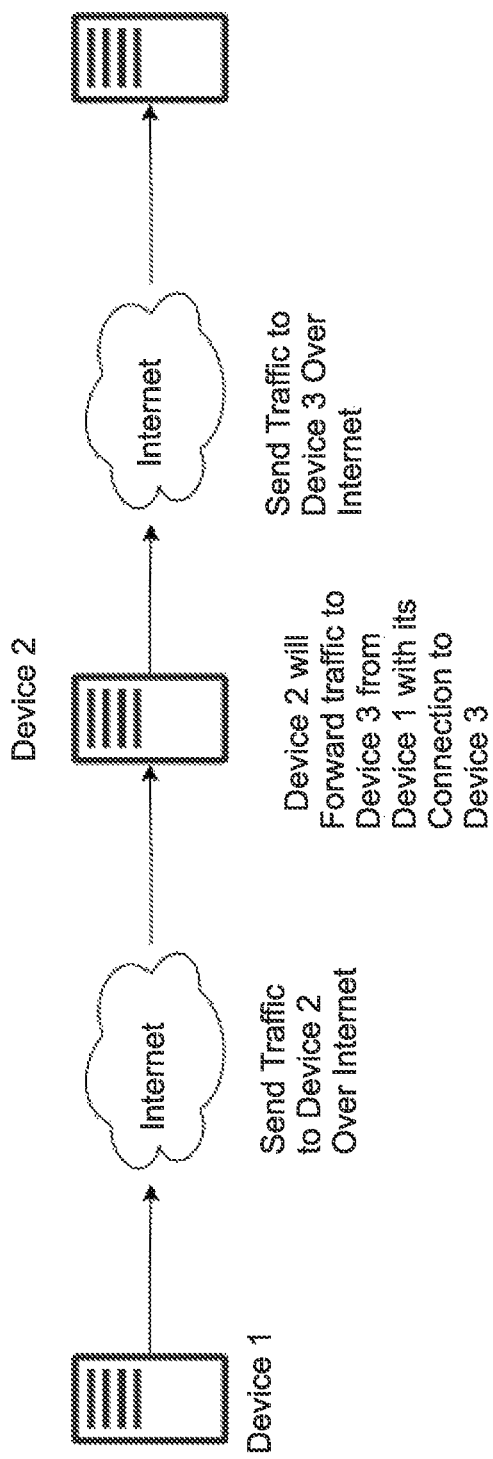
FIG. 8 is a visual representation of a method of packet forwarding.

Subnet identification, in terms of finding all connected and relevant paths in the network, can be achieved in two ways. In a local area connection, the ARP protocol can be expanded for the device to announce itself with relevant subnet ids it is a part of. No authentication is needed for the ARP announcement, since if no client or issuer token exists for the device's MAC address, then no other device in the subnet will attempt to connect or route traffic to it. For non-local area connections, the device will use normal routing mechanisms. The only exception is that if the device does not have a direct token relationship with the end device. The connecting device is authenticated with device 2 and device 2 is authenticated with device 3. Device 1 will have to route traffic to device 2, device 2 after authenticating device 1, device 2 will then send traffic to device 3 on behalf of device 1 with its client token for device 3. This concept is shown in FIG. 8.

Figure 9:
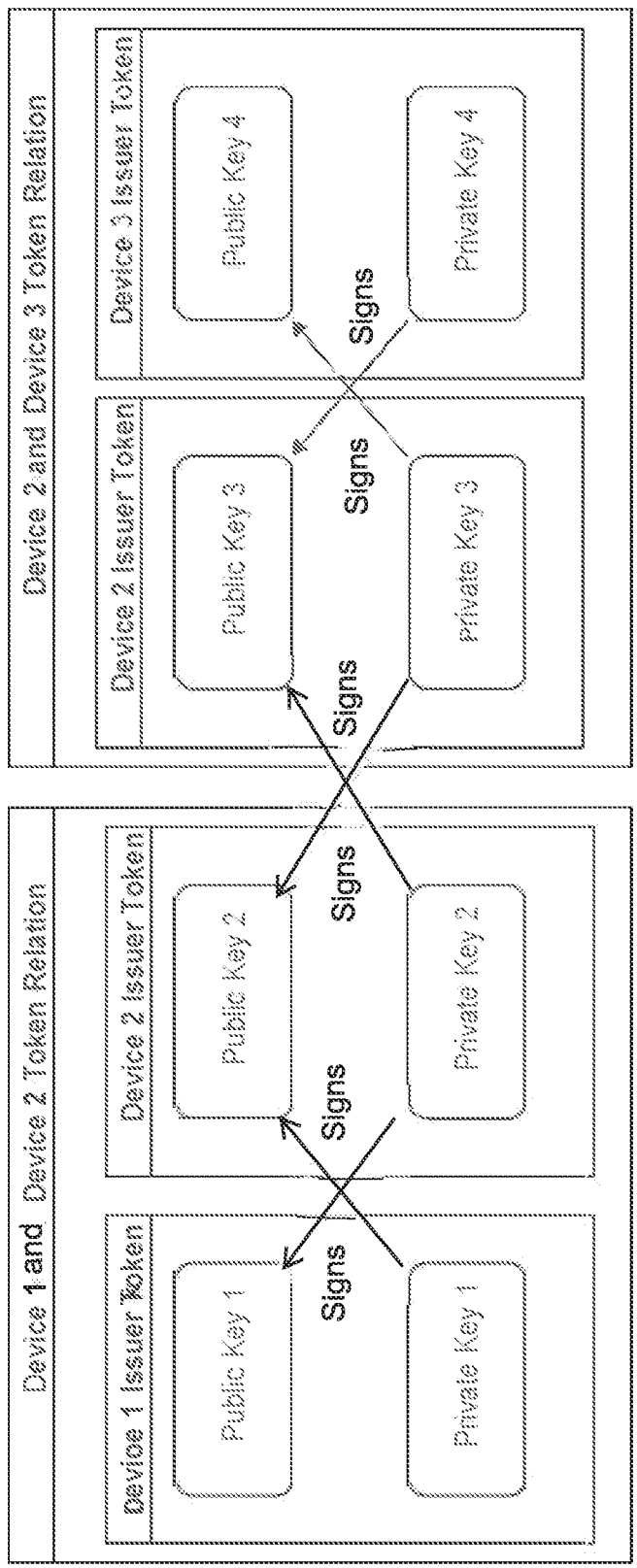
FIG. 9 is a visual representation of a method of chain token creation.
Figure 10:
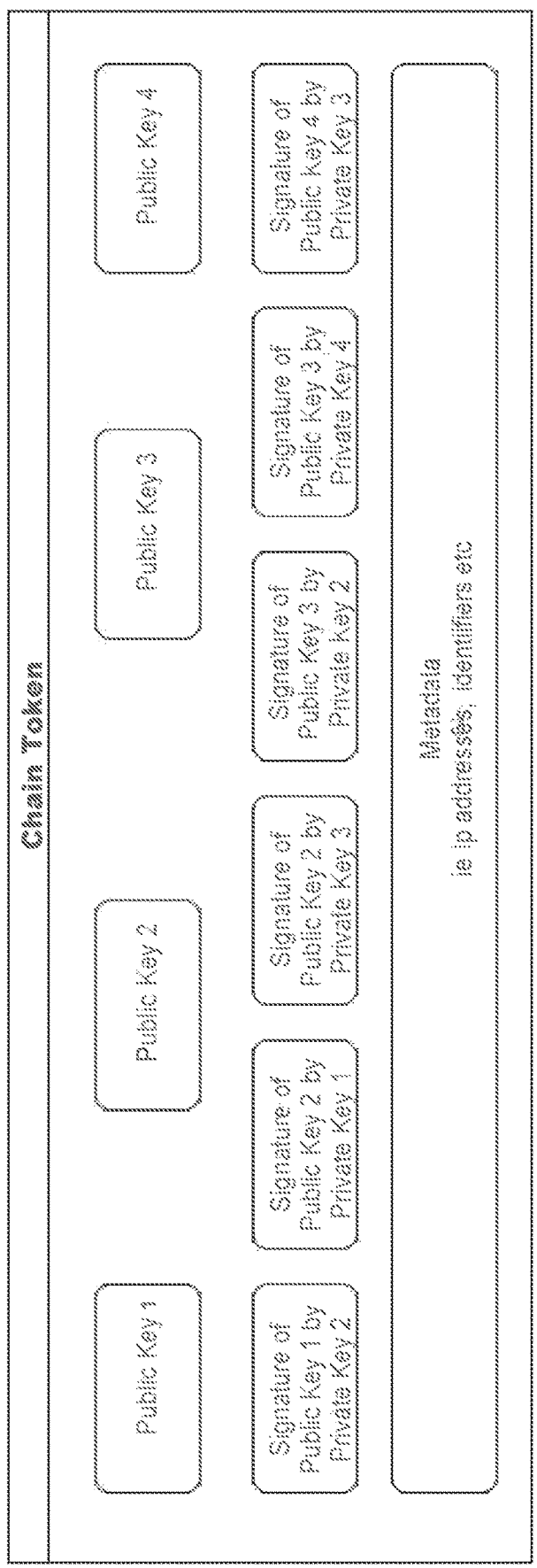
FIG. 10 is a visual representation showing the result of the method of FIG. 9.

As a subnet grows, the case arises where the distance between two nodes on the subnet graph may want to be compressed. This can be achieved by the concept of "chain" tokens. An example, shown in FIG. 9, is that device 1 is authenticated with device 2, and device 2 is authenticated with device 3. Device 1 wishes to have a direct token relationship with device 3. Device 1 authenticates with device 2 and they decrypt their public key pairs on their issuer tokens known as Public/Private Key 1 and Public/Private Key 2. Device 1 will then sign device 2's Public Key 2 with its Private Key 1 and device 2 will then sign device 1's Public Key 1 with its Private Key 2. These signatures, issuer/tokens public keys, and other metadata such tokens identifiers and/or IP addresses are stored in a new token. This token is then passed on to device 2. Device 2 will repeat the process with device 3 with the corresponding public/private key pairs known as Public/Private Key 3 and Public/Private Key 4. An extra step also occurs by having device 2's Private Key 2 sign its Public Key 3, and its Private Key 3 sign its Public Key 2. This will create a complete chain of signatures from its origin. Once the token is passed onto device 3, it has reached the end node and the result is shown in FIG. 10.

Figure 11:
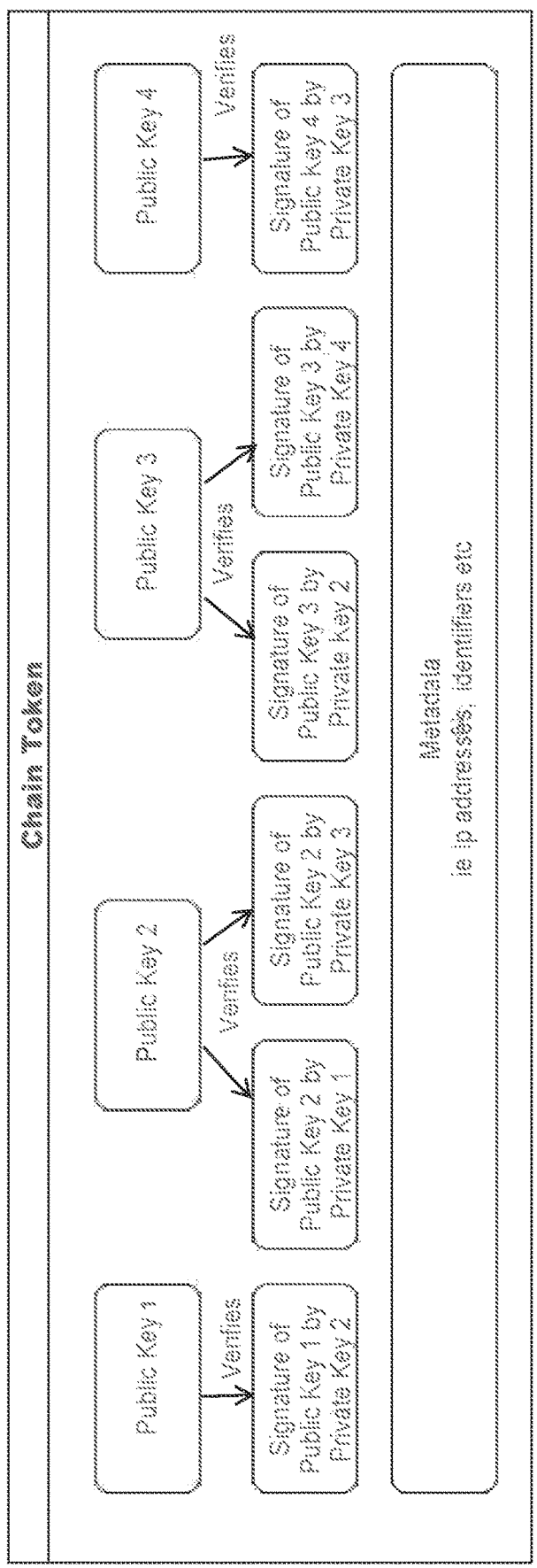
FIG. 11 is a visual representation of a method of chain token verification.

For verification of the token, device 3 will then ask device 1 and device 2 for the public keys on the listed tokens. If the provided public keys match the public keys on the chain token, the process continues. Device 3 will then authenticate all the statically signed and listed token signatures by using the appropriate public keys, as shown in FIG. 11. Once the chain token is verified, then device 3 trusts that device 1 is a legitimate downstream device on the subnet. Device 3 will then send an authentication request to device 1 with the chain token attached. The chain token is then re-verified by device 1, and once verified both device 3 and device 1 will exchange issuer/client tokens with each other with the chain token as proof of validity.

Figure 12:
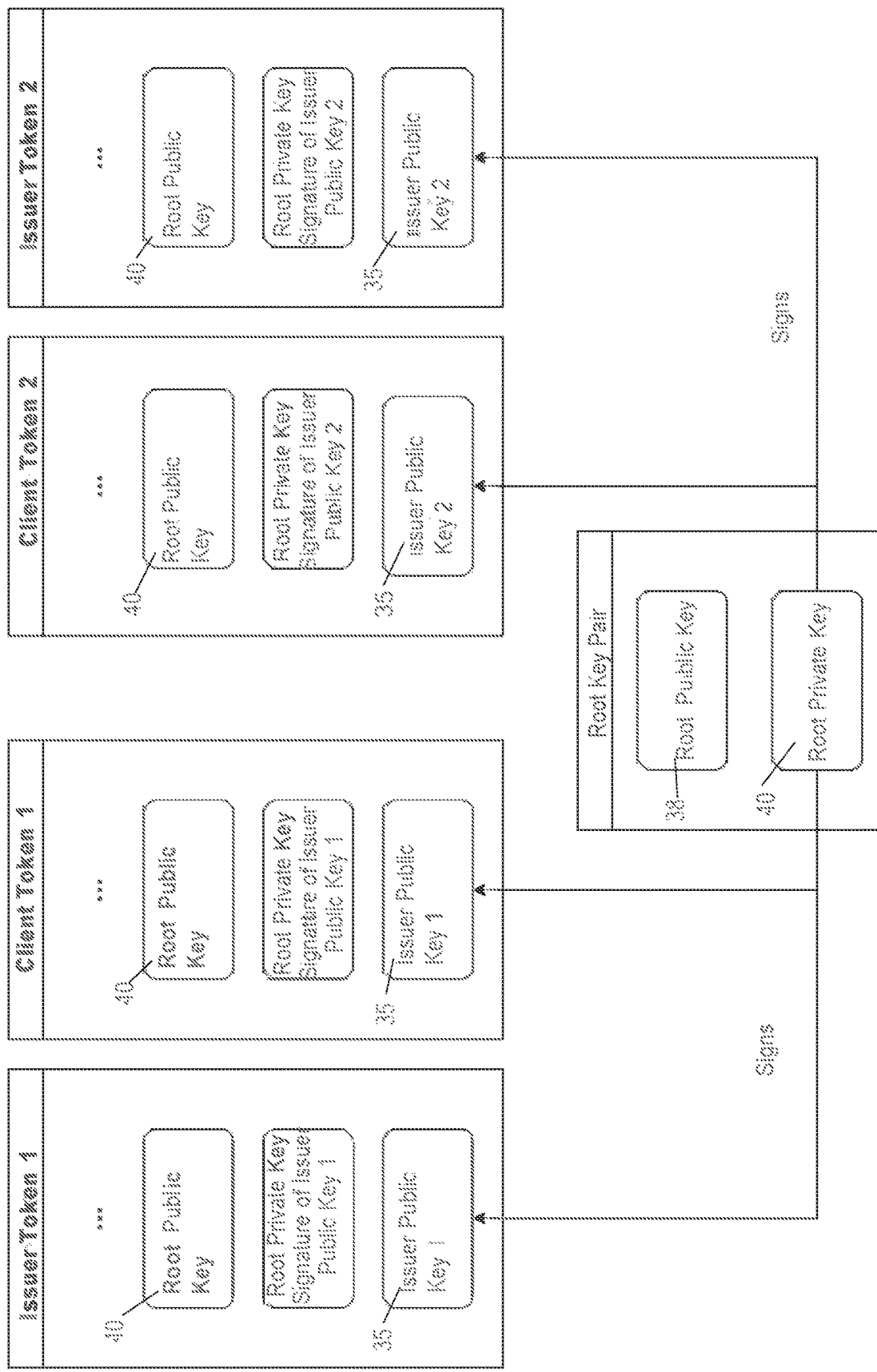
FIG. 12 is a visual representation of a method of root key signing.

Subnet expansion can be achieved by having a device within the current subnet create and exchange issuer/client tokens with a new device using the processes described in FIGS. 1-5. While the previous approach works, it may not be desirable for all the devices on a subnet to be able to add new devices to the network. This can be solved by having "master" nodes. The first master node is the device that creates the subnet id and exchanges tokens with the first device added. The master node will also generate something known as the root public/private key pair 38, which can be any public/private key pair algorithm that provide signatures. This root key pair 38, 40 will then sign the public keys 35, 37 of both devices' issuer tokens and provide the public key of the key pair for each tokens to store in its encrypted secret. This process is shown in FIG. 12.

Figure 13:
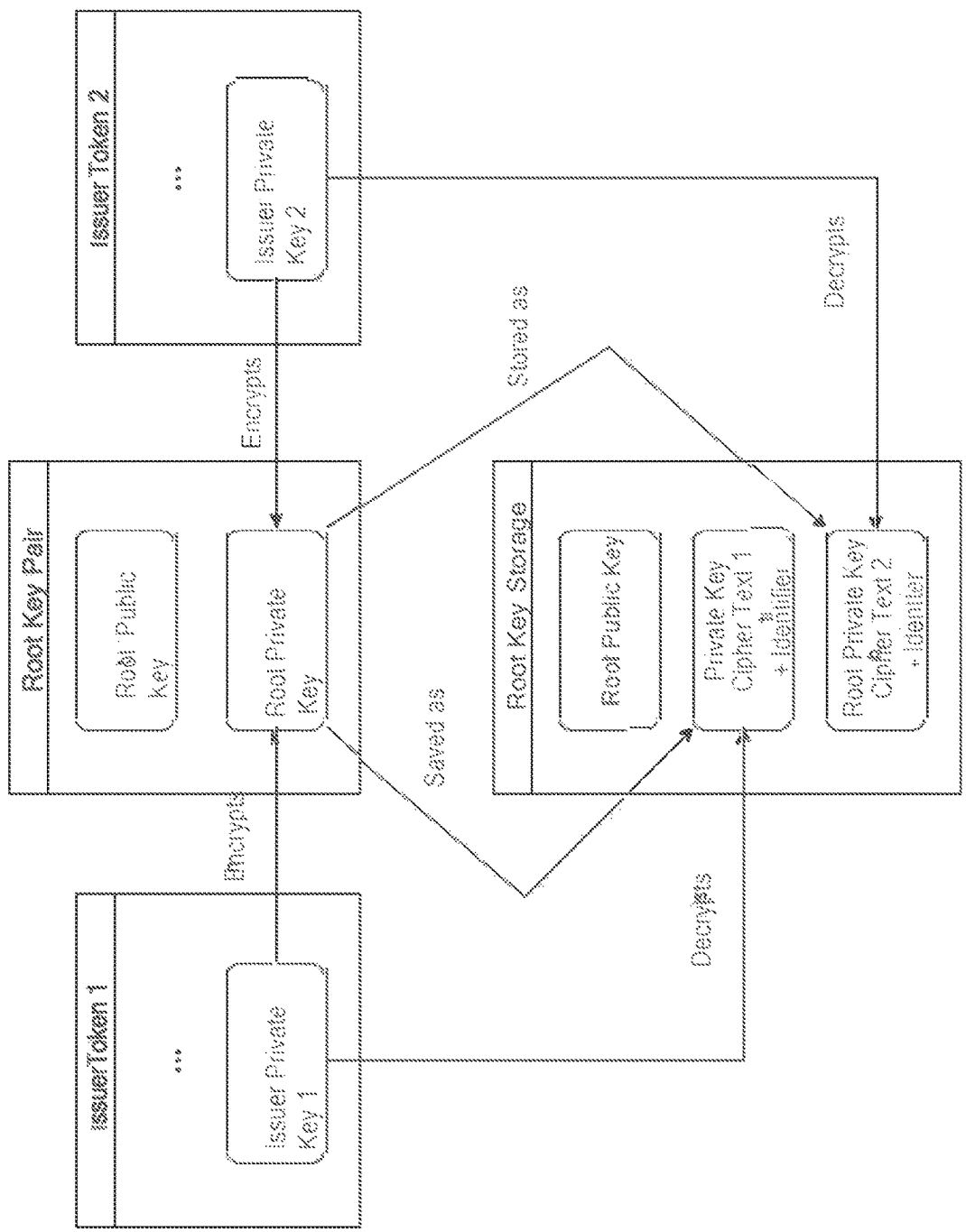
FIG. 13 is a visual representation of a method of root key storage.

The root key pair is then encrypted by the key pair, or a symmetric key, that is stored in the issuer token encrypted secret. An example shown in FIG. 13 shows that the storage of the root key expands as the number of issuer token grows. This is because each issuer token private key or symmetric key will encrypt the root private key as individual cipher text and store it individually. This allow for each issuer token on the master node to access the root key pair when master node duties are needed.

Figure 14:
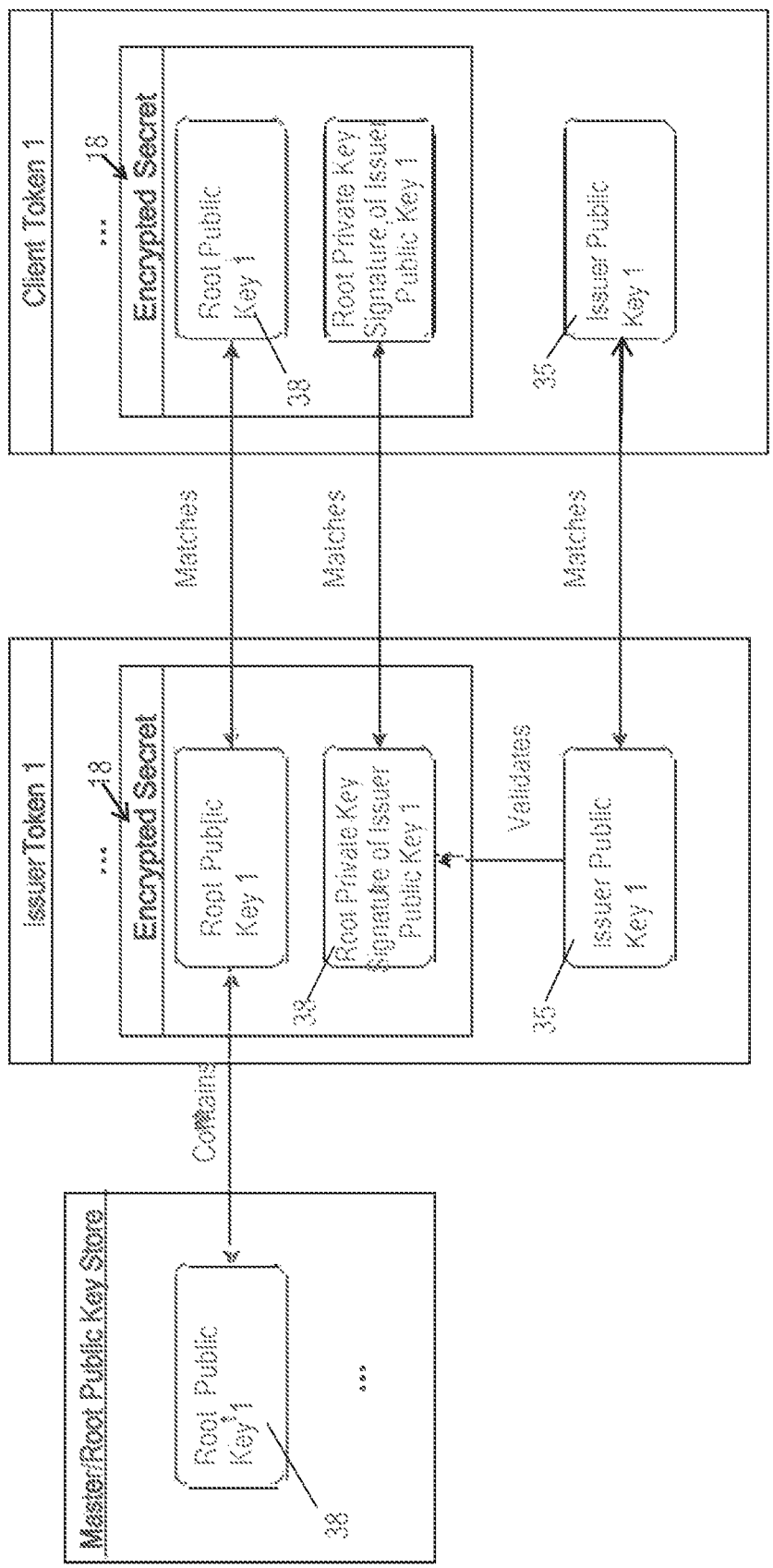
FIG. 14 is a visual representation of a method of root key verification.

The devices will keep track of known master public keys in a data store and if a connected token cannot provide a valid signature of its public for validation the device will refuse the connection and treat it as though as if it was unauthenticated. The verification process shown in FIG. 14 is as follows. The verifying device will decrypt the encrypted secrets of both the client token and the issuer token. The device will verify that the root public key, the signature and the issuer public key all match that of the client token. The device will then verify the root public key is a known "master" key by checking its master/root public key store. The device will finally validate that the signature of the issuer public key is valid using the root public key. If the signature is valid then the tokens have been successfully approved by a master node.

New connections to the subnet can achieved by having the connecting device create a token relation with master node. If the master node wishes to add the device, it will follow the processes shown in FIGS. 9 and 10. Once the issuer token has been created on the master node, the master node will choose any issuer key to reach out to a connected device to unlock it private key. Once unlocked, it will decrypt the root private key. The master node will then apply the process shown in FIG. 12 to sign the token's public keys. A new ciphertext will be added to the master storage using the private key or a symmetric key stored on the new issuer token on the master node device using the process shown FIG. 13.

Figure 15:
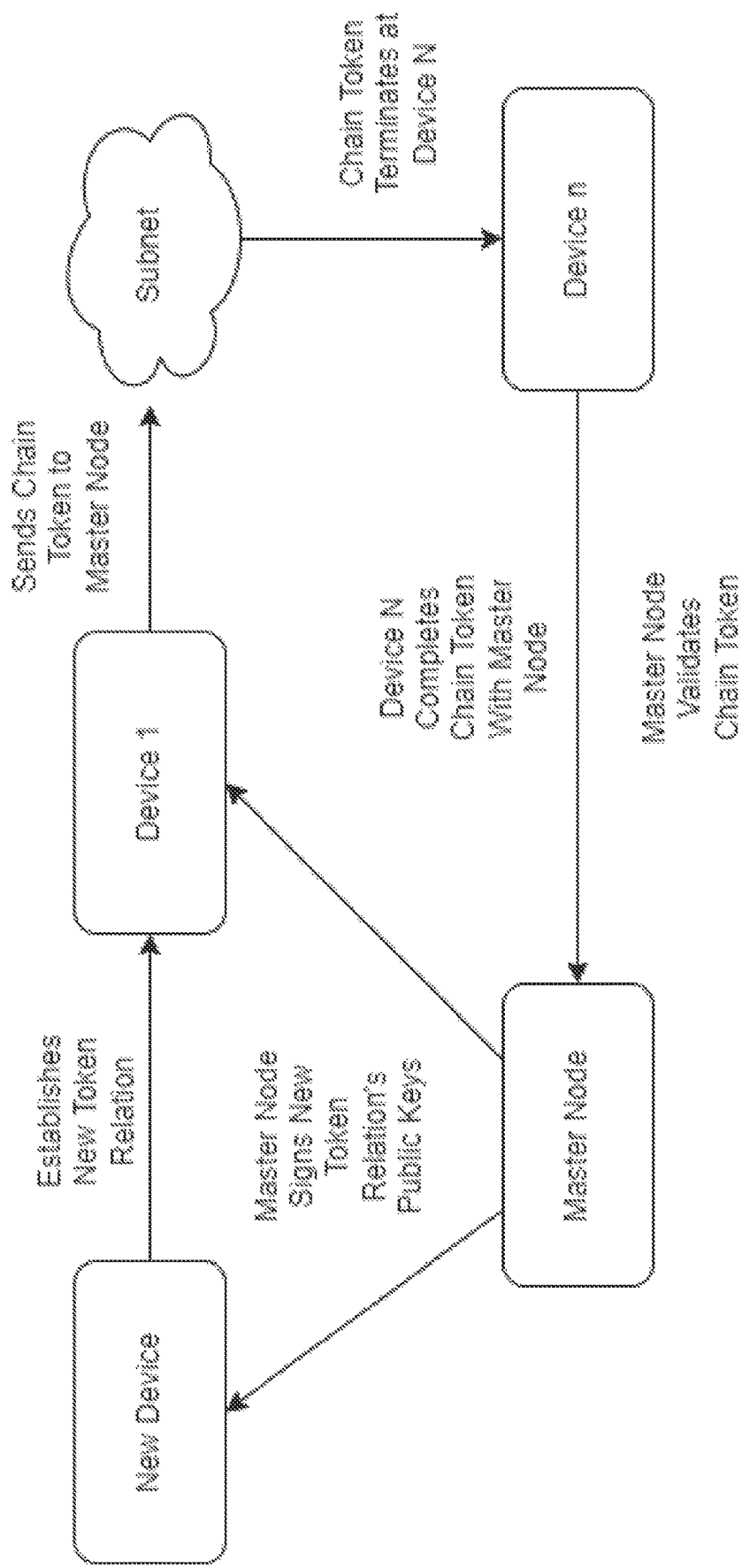
FIG. 15 is a visual representation of a method of network expansion.

Connections made away from the master node can still be "approved" by creating a chain token using the methods shown in FIGS. 9-11, from the newly paired device all the way to the master node. The master node will validate the chain token and if the node master wants to allow this connection it will sign the new public keys on the new issuer and client tokens using the process described shown FIG. 12. This allows for the new tokens to be used and be considered valid. This process is shown in FIG. 15.

Figure 16:
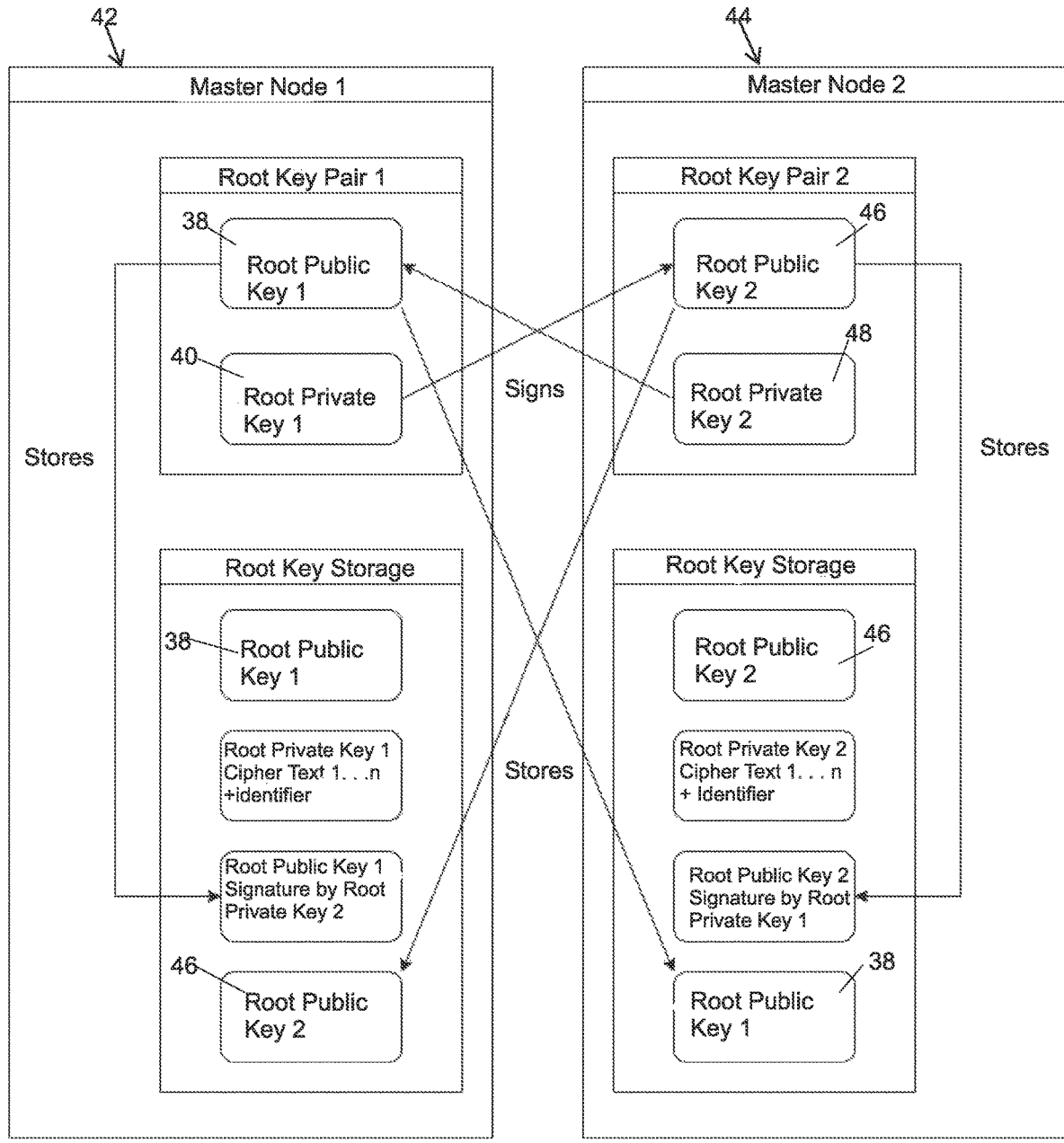
FIG. 16 is a visual representation of a method of master node storage.

New master nodes can be created as a network expands. This process will have a master node 42 establish a direct token relationship to the new master node 44 using a chain token. Once that relationship is established, the master node 42 will ask the new node 44 to create a root key pair 46, 48. The new node 44 will then provide its root key pair to the master node 42. The new node 44 will secure its root key pair 46, 48 with the process shown in FIG. 13 and will request all connected devices to authenticate, which unlocks the issuer tokens private key pairs on the new master node, to create the encrypted duplicates of the root key. Both the original master node and the new master node will append their root key storage with each other's signature of their public keys with their respective opposite's private keys as well as the opposites public keys. This is shown in FIG. 16.

Figure 17:
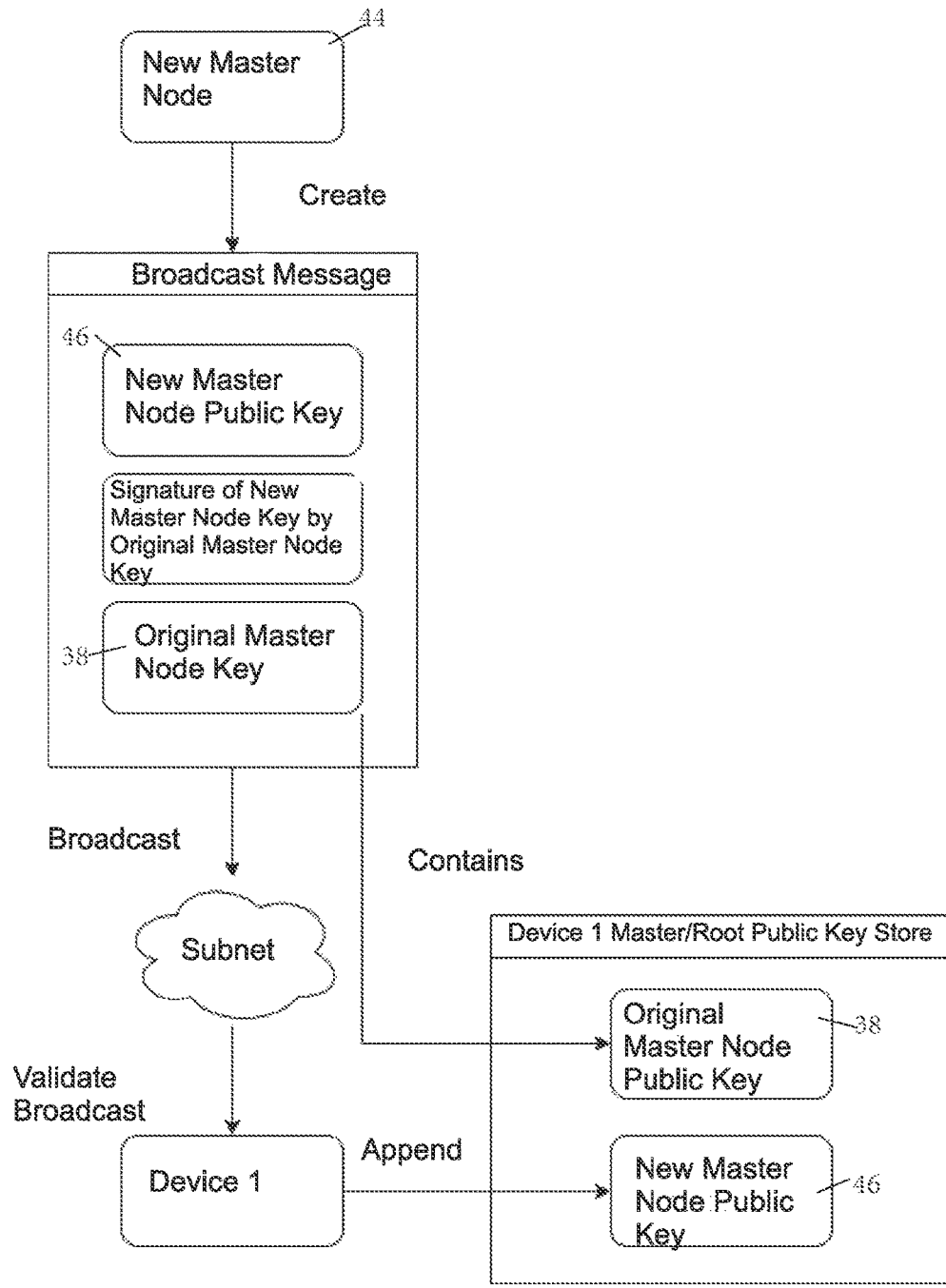
FIG. 17 is a visual representation of a method of broadcasting a new master node.

The new master node will do a broadcast across the entire subnet with a signature of the new node's root public key with the original public key, the new public key, and the original public key. All the devices on the subnet should know the original root public key and will validate that original root public key is the same and the new root public key added is signed with the original and will then store both public keys as valid root keys. If the public key is not known, the broadcast is considered as invalid. This process is shown in FIG. 17 and allows for either master node to approve new devices and their connections to be considered valid.

Figure 18:
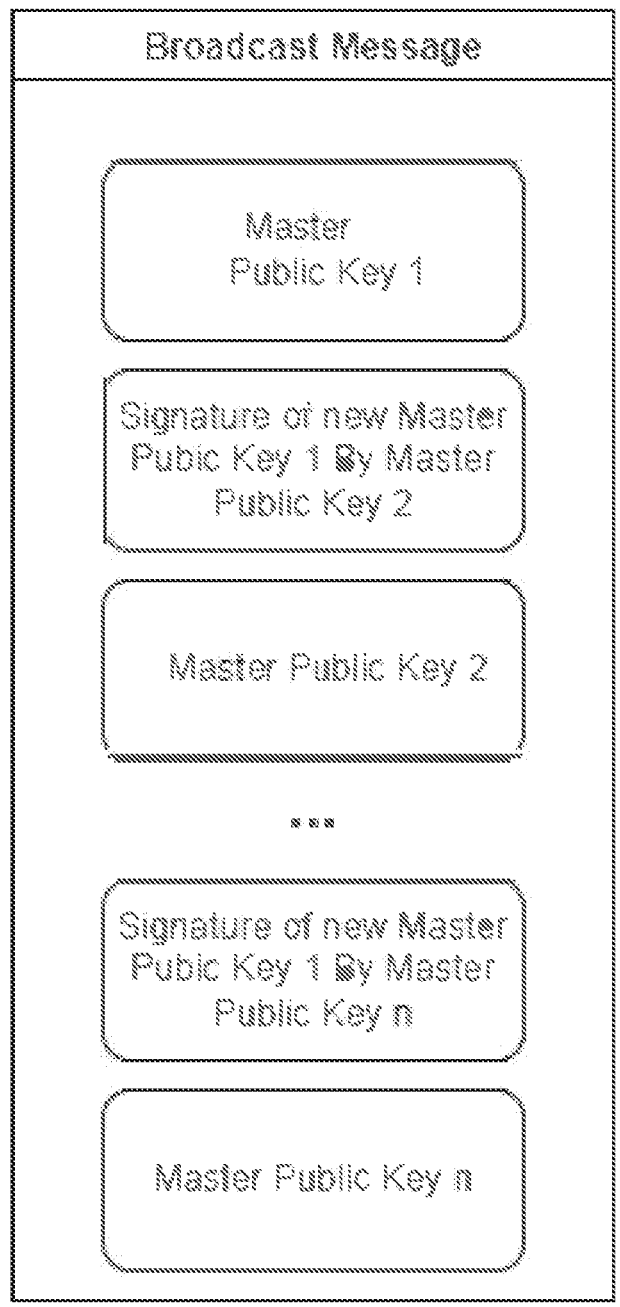
FIG. 18 is a visual representation of a modified broadcast message.

To ensure that all devices on a subnet know about master nodes, the master nodes will do a routine broadcast over the subnet either at a variable or fixed interval. The broadcast message will be modified to contain all the other master nodes signatures on the originator master node public key that the originator has in storage, as shown in FIG. 18. This broadcast will have the devices on the subnet update their master/root public key stores with the broadcast information shown in FIG. 17. It is recommended that all master nodes sign each other's root keys to prevent a situation where a device will not recognize a master node using the processes shown in FIGS. 13 and 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of creating mutual dependency between a first network-enabled device and a second network-enabled device, comprising:
   using a store key to encrypt a secret;
   creating a hash of the store key using a cryptographic hash algorithm;
   using an unlock key to encrypt the store key;
   using a naked key to encrypt the unlock key;
   storing the naked key and encrypted store key in an issuer token in the first network-enabled device;
   storing the encrypted unlock key in a client token in the second network-enabled device;
   storing the encrypted secret in either the issuer token, the client token, or both;
   storing the hash of the store key in in either the issuer token, the client token, or both; and
   providing the client token to the first network-enabled device for authentication.

2. A method of authenticating a connection between an issuer and a client, comprising:
   using a store key to encrypt a secret;

creating a hash of the store key using a cryptographic hash algorithm;
using an unlock key to encrypt the store key;
using a naked key to encrypt the unlock key;
storing the naked key and encrypted store key in an issuer token;
storing the encrypted unlock key in a client token;
storing the encrypted secret in either the issuer token, the client token, or both; and
storing the hash of the store key in in either the issuer token, the client token, or both;
using the naked key in the issuer token to decrypt the encrypted unlock key in the client token;
decrypting the encrypted store key in the issuer token using the decrypted unlock key in the client token to create plain text;
hashing the decrypted store key using the cryptographic hash algorithm; and
comparing the hash of the decrypted store key to the original store key hash; and
authenticating the connection if the hashes match.

3. The method of claim 2, wherein:
the client token is stored on a web browser and includes client metadata; and
the issuer token is stored in a data store associated with a web server or application and includes issuer metadata.

4. The method of claim 3, further comprising:
generating a public key pair including a public key and a private key;
storing the public key in both the client metadata and the issuer metadata;
storing the private key in the issuer secret; and
storing a unique subnet id both client metadata and the issuer metadata.

5. The method of claim 3, wherein the webserver is configured to invalidate the tokens by storing an expiration date or a flag in the metadata of the issuer token, or by deleting the token from the data store.

* * * * *